US012789985B1

(12) United States Patent
Luo

(10) Patent No.: US 12,789,985 B1
(45) Date of Patent: Nov. 10, 2026

(54) MODULAR MULTICOPTER WITH CENTRAL FRAMES AND QUICK RELEASE STRUCTURES

(71) Applicant: East Field Corporation, Taoyuan City (TW)

(72) Inventor: Chieh Luo, Taoyuan City (TW)

(73) Assignee: EAST FIELD CORPORATION, Taoyuan City (TW)

( * ) Notice: Subject to any disclaimer, the term of this patent is extended or adjusted under 35 U.S.C. 154(b) by 0 days.

(21) Appl. No.: 19/273,402

(22) Filed: Jul. 18, 2025

(51) Int. Cl.
*B64C 27/20* (2023.01)

(52) U.S. Cl.
CPC .......... *B64C 27/20* (2013.01); *B64C 2211/00* (2013.01)

(58) Field of Classification Search
CPC .... B64U 30/20; B64U 30/294; B64U 30/291; B64U 30/292; B64U 20/40
See application file for complete search history.

(56) References Cited

U.S. PATENT DOCUMENTS

| | | | | |
|---|---|---|---|---|
| 2019/0031332 | A1* | 1/2019 | Dogru | B64C 27/14 |
| 2025/0319957 | A1* | 10/2025 | Ikeda | B64U 10/13 |
| 2025/0319975 | A1* | 10/2025 | Hatanaka | B64U 50/19 |

FOREIGN PATENT DOCUMENTS

| | | | | | |
|---|---|---|---|---|---|
| CN | 110406669 | A | * | 11/2019 | B64C 27/08 |
| CN | 113022855 | A | * | 6/2021 | B64U 30/20 |
| CN | 113619787 | A | * | 11/2021 | B64U 30/20 |
| KR | 101937156 | B1 | * | 1/2019 | B64D 47/00 |
| KR | 102046106 | B1 | * | 11/2019 | B64C 27/08 |
| KR | 102266989 | B1 | * | 6/2021 | B64U 50/13 |
| WO | WO-2022000198 | A1 | * | 1/2022 | B64U 50/19 |

* cited by examiner

*Primary Examiner* — Arfan Y. Sinaki
(74) *Attorney, Agent, or Firm* — Birch, Stewart, Kolasch & Birch, LLP

(57) ABSTRACT

A modular multicopter with central frames and quick release structures, includes: two central frames, multiple machine arm frames, multiple first quick release structures, multiple machine arm positioning rods and multiple second quick release structures; central frames, multiple machine arm frames, the central frames and the machine arm frames are no longer disassembled after being fixed to the rods, the end of the machine arm positioning rods are no longer disassembled after the fixed connection sleeve is fixed, so that the aircraft body can be disassembled for convenient transportation and parking.

8 Claims, 8 Drawing Sheets

MODULAR MULTICOPTER WITH CENTRAL FRAMES AND QUICK RELEASE STRUCTURES

BACKGROUND OF THE INVENTION

1. Field of the Invention

An invention relates to a modular multicopter with central frames and quick release structures, especially to one that is a modular design for easy parking and transportation.

2. Description of the Related Art

Conventional large multicopter all adopt a fixed body design, and the body size cannot be adjusted and cannot be disassembled. However, due to the large body size and long arms of large multicopter, in addition to requiring a large parking space, it also requires a larger transportation space or even special transportation vehicle during transportation.

SUMMARY OF THE INVENTION

A primary objective of the present invention is to provide a modular multicopter with central frames and quick release structures, which solves the problem of cannot be disassembled, the machine body can be disassembled for easy transportation and parking.

Another objective of the present invention is to achieve the effect of machine body size adjustment.

In order to achieve the above objectives, the present invention includes: two central frames, multiple machine arm frames, multiple first quick release structures, multiple machine arm positioning rods and multiple second quick release structures; each central frame has a central connection unit, multiple frame arm rods, multiple frame edge connection rings and multiple frame side cross rods, the central connection unit is radially formed with multiple frame arm rod inner connection members, an inner end of each frame arm rod is fixed one-to-one to each frame arm rod inner connection member, each frame edge connection ring is formed with a frame arm rod external connection member and two frame edge cross rod connection members, each frame edge connection ring is fixed one-to-one to an outer end of each frame arm rod by corresponding frame arm rod external connection member, and two ends of each frame edge cross rod are respectively fixed to the two frame edge cross rod connection members which arranged in opposite direction; each machine arm frame includes a frame edge vertical rod, a machine arm rod, a machine arm rod inner connection ring and a machine arm rod external connection unit, the machine arm rod inner connection ring is fixed to the frame edge vertical rod, the frame edge vertical rod comprises an upper assembly section and a lower assembly section, the machine arm rod inner connection ring forms a machine arm rod inner connection member, an inner end of the machine arm rod is fixed to the machine arm rod inner connection member, the machine arm rod external connection unit forms a machine arm rod external connection member and two machine arm positioning rod connection members, and the machine arm rod external connection unit is fixed to an outer end of the machine arm rod by corresponding machine arm rod external connection member; during assembling into a multicopter, the machine arm frames are arranged radially, and the frame edge connection rings of the two central frames are respectively mounted on the upper assembly section and the lower assembly section of the frame edge vertical rod, and the frame edge connection rings are connected and positioned on the upper assembly section and the lower assembly section of the frame edge vertical rod by using the first quick release structures one-to-one; and two ends of the machine arm positioning rods are connected and positioned on the machine arm positioning rod connection members which arranged in opposite direction by using the second quick release structures one-to-one.

Also, each machine arm frame has a reinforcement rod and a reinforcement rod inner connection ring, the machine arm rod external connection unit forms a reinforcement rod external connection member, the reinforcement rod inner connection ring is fixed to the frame edge vertical rod, the reinforcement rod inner connection ring forms a reinforcement rod inner connection member, an inner end of the reinforcement rod is fixed to the reinforcement rod inner connection member, and an outer end of the reinforcement rod is fixed to the reinforcement rod external connection member.

Also, the first quick release structure has a first latch and a first latch through hole, the first latch through hole is formed on the frame edge connection rings and the frame edge vertical rod, and the first latch is set through the first latch through hole to connect and position the frame edge connection rings and the frame edge vertical rod; wherein the first quick release structure has a liner plug, the liner plug is formed with the first latch through hole and plugged in the frame edge vertical rod, the first latch is a flat head pin with a side hole and a cotter pin.

Also, the second quick release structure has a movable connection sleeve, a fixed connection sleeve, a limiting ring, a second latch, and a second latch through hole, the movable connection sleeve has an inner end reduced member, the fixed connection sleeve is fixed on the end of the machine arm positioning rods, the fixed connection sleeve is extended a shaft column member, the shaft column member is configured to pass through the inner end reduced member, and the limiting ring is combined with a head end of the shaft column member, the movable connection sleeve is fixed by the inner end reduced member being constrained by the limiting ring, the second latch through hole is formed in the radial direction of the shaft column member, the second latch is set through the second latch through hole so that the inner end reduced member is to press against the limiting ring, and an outer end of the movable connection sleeve is connected and positioned to the machine arm positioning rod connection member in a sleeve manner; wherein the second quick release structure has a gasket, which is clamped between the inner end reduced member and the limiting ring, and the second latch is a flat head pin with a side hole and a cotter pin.

DETAILED DESCRIPTION OF THE PREFERRED EMBODIMENT

Figure 1:
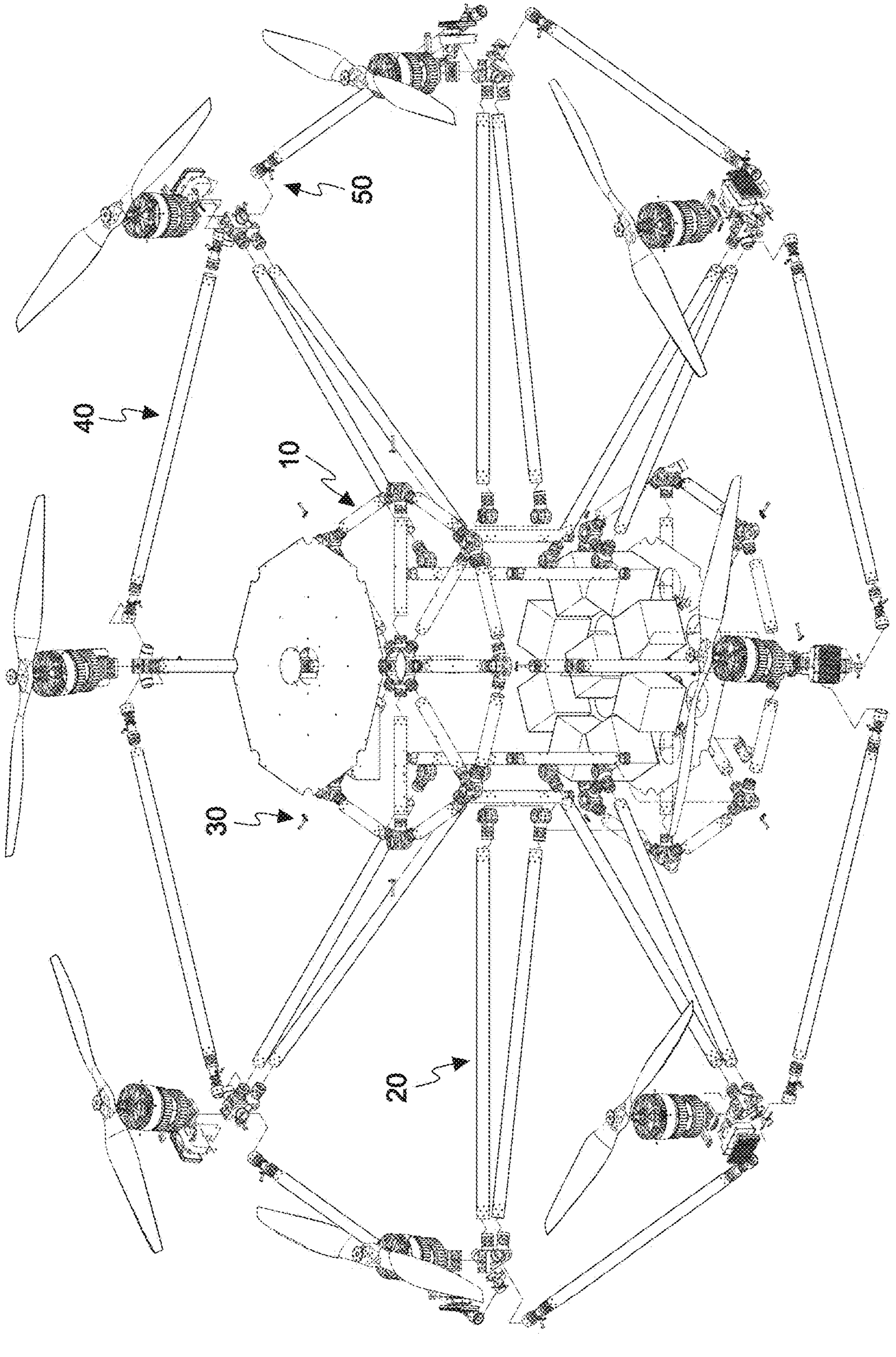
FIG. 1 is an exploded prospective view of the present invention.
Figure 2:
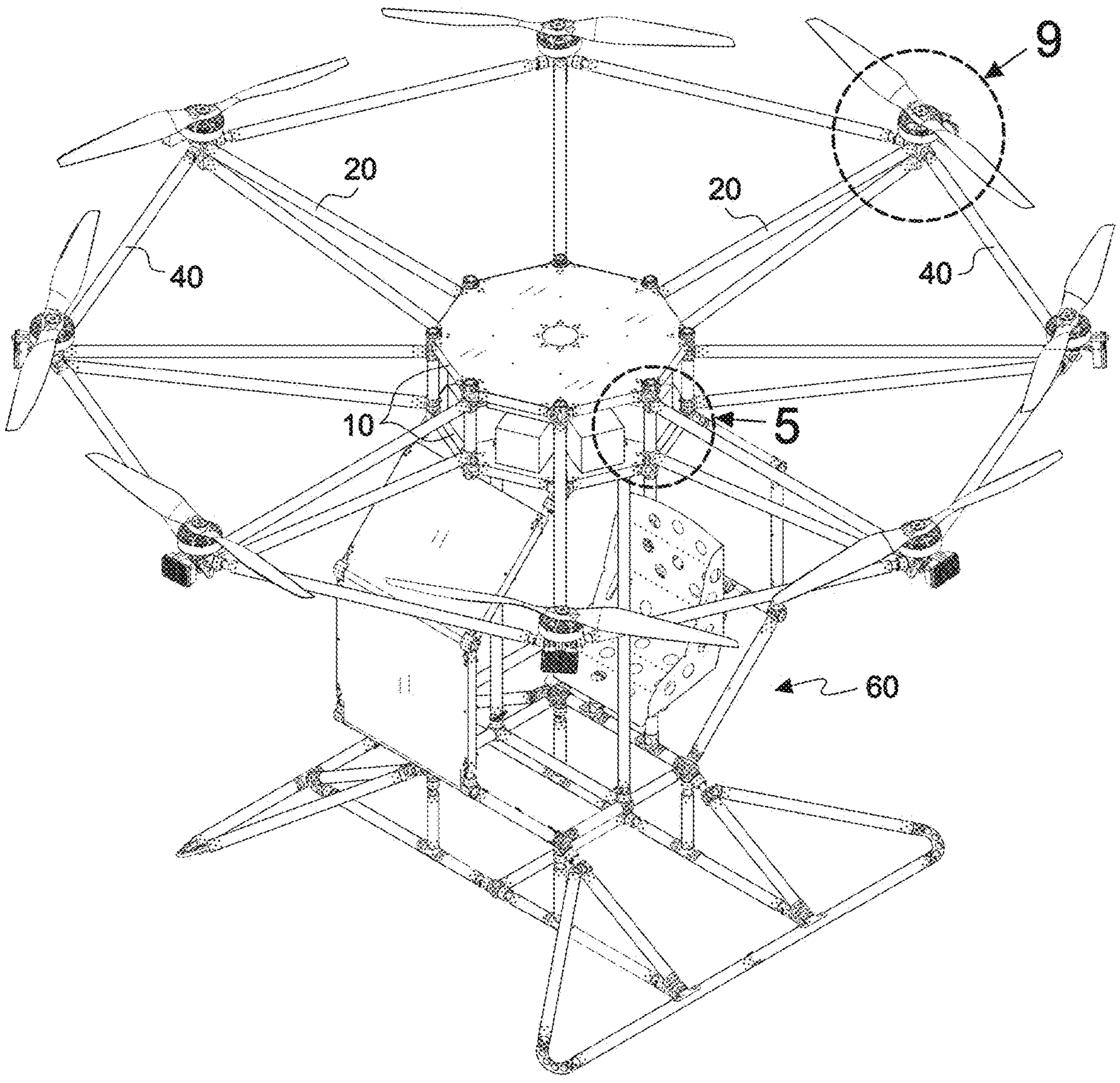
FIG. 2 is an assembly prospective view of the present invention.

Referring to FIGS. 1~2, the present invention, a modular multicopter with central frames and quick release structures, includes: two central frames 10, multiple machine arm frames 20, multiple first quick release structures 30, multiple machine arm positioning rods 40 and multiple second quick release structures 50, After the assembly is completed, a foot frame (and payload) 60 can be hung under the multicopter. The hung foot frame (and payload) 60 is not the subject of the present invention, so will not be disclosed in detail.

Figure 3:
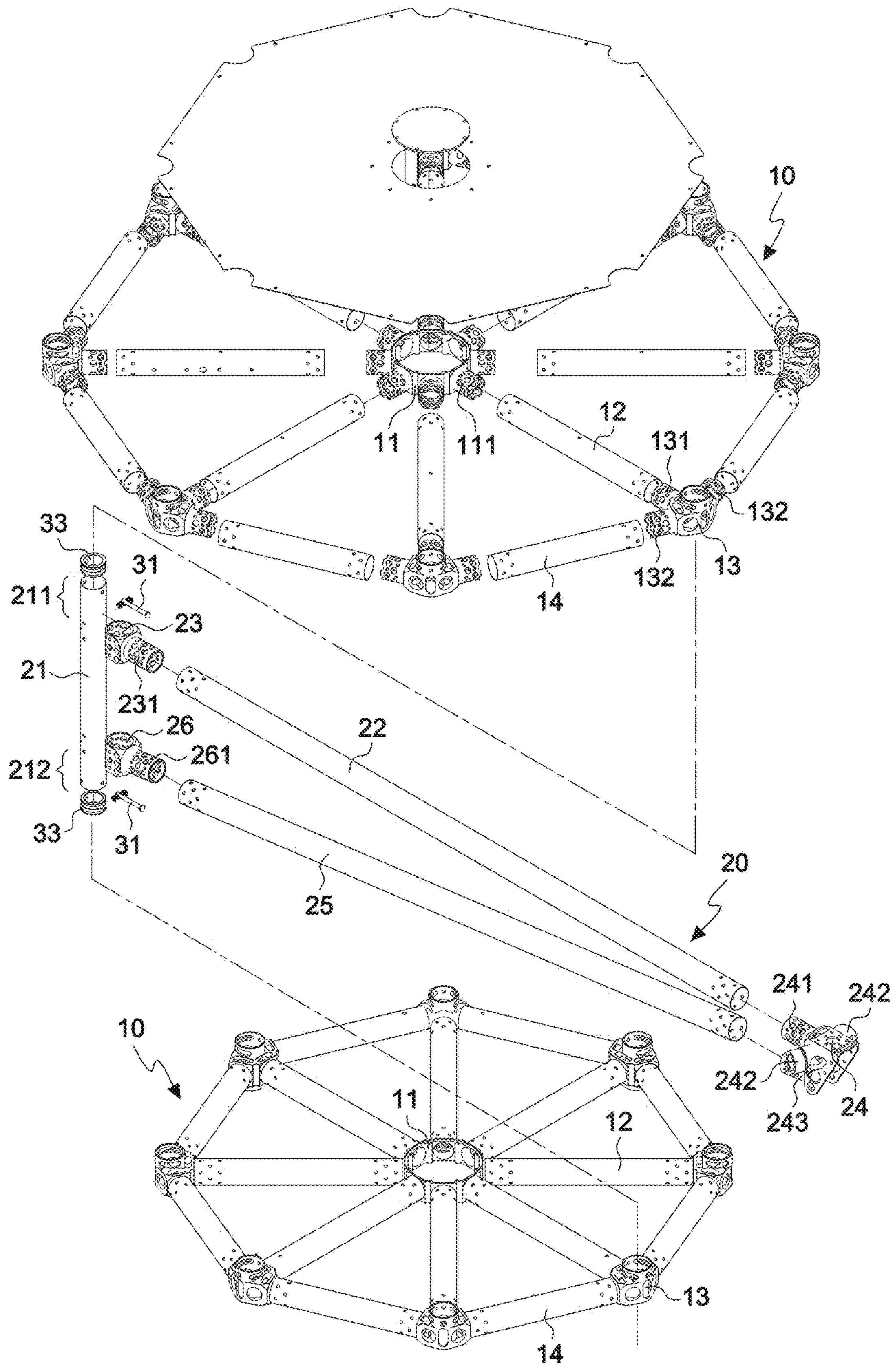
FIG. 3 is an exploded prospective view of the central frame and the machine arm frame of the present invention.
Figure 4:
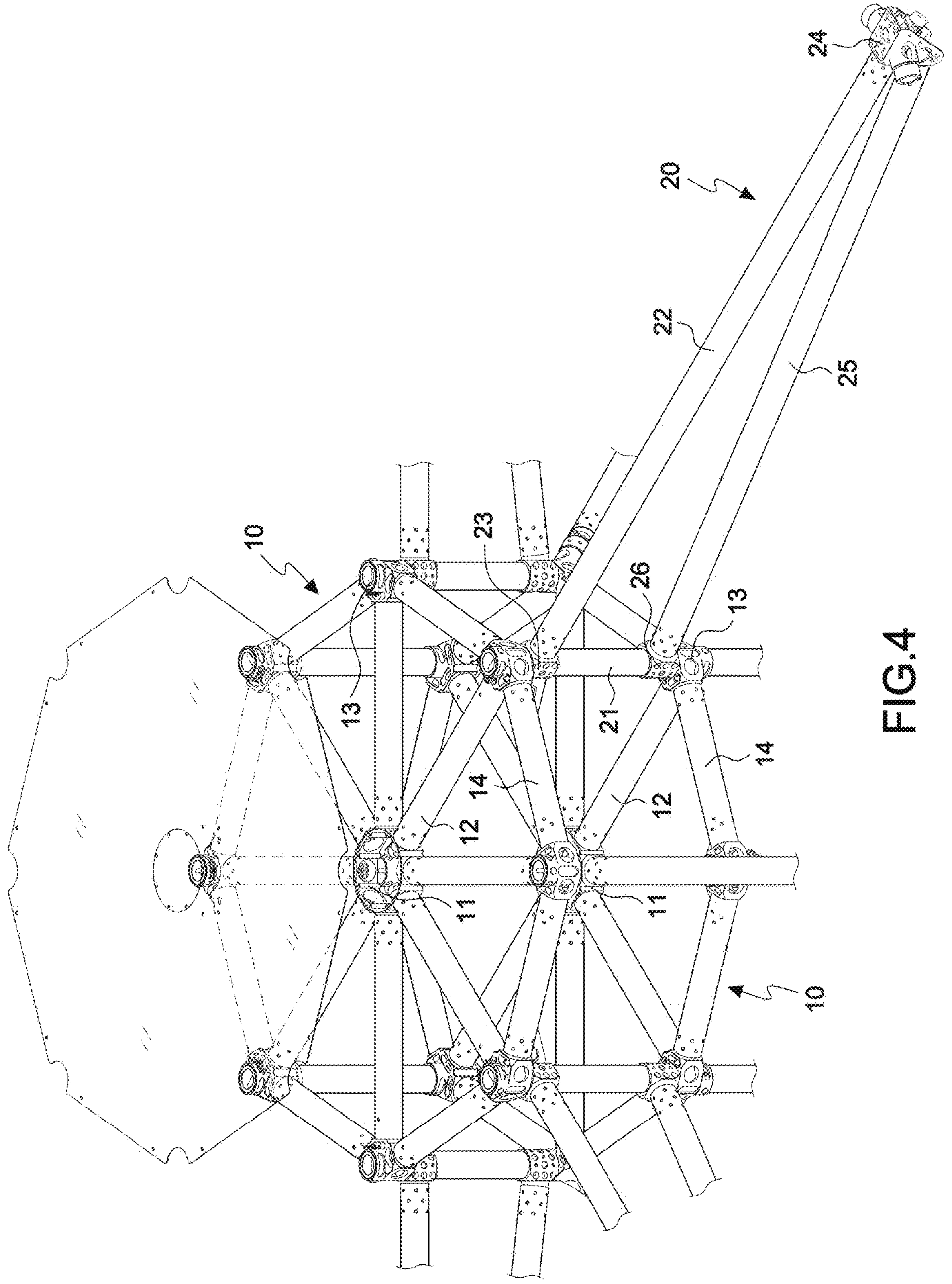
FIG. 4 is an assembly prospective view of the central frame and the machine arm frame of the present invention.

Referring to FIGS. 3~4, each central frame 10 has a central connection unit 11, multiple frame arm rods 12, multiple frame edge connection rings 13 and multiple frame side cross rods 14, the central connection unit 11 is radially formed with multiple frame arm rod inner connection members 111, an inner end of each frame arm rod 12 is fixed (riveted) one-to-one to each frame arm rod inner connection member 111, each frame edge connection ring 13 is formed with a frame arm rod external connection member 131 and two frame edge cross rod connection members 132, each frame edge connection ring 13 is fixed (riveted) one-to-one to the outer end of each frame arm rod 12 by its frame arm rod external connection member 131, and the two ends of each frame edge cross rod 14 are respectively fixed (riveted) to the two frame edge cross rod connection members 132 which arranged in opposite direction, and each frame edge cross rod 14 forms a central frame edge of a surrounding shape.

Referring to FIGS. 3~4, the machine arm frame 20 includes a frame edge vertical rod 21, a machine arm rod 22, a machine arm rod inner connection ring 23 and a machine arm rod external connection unit 24, the machine arm rod inner connection ring 23 is fixed (riveted) to the frame edge vertical rod 21, the frame edge vertical rod 21 comprises an upper assembly section 211 and a lower assembly section 212, the machine arm rod inner connection ring 23 forms a machine arm rod inner connection member 231, an inner end of the machine arm rod 22 is fixed (riveted) to the machine arm rod inner connection member 231, the machine arm rod external connection unit 24 forms a machine arm rod external connection member 241 and two machine arm positioning rod connection member 242, and the machine arm rod external connection unit 24 is fixed (riveted) to the outer end of the machine arm rod 22 by corresponding machine arm rod external connection member 241; the machine arm frame 20 has a reinforcement rod 25 and a reinforcement rod inner connection ring 26, the machine arm rod external connection unit 24 forms a reinforcement rod external connection member 243, the reinforcement rod inner connection ring 26 is fixed (riveted) to the frame edge vertical rod 21, the reinforcement rod inner connection ring 26 forms a reinforcement rod inner connection member 261, an inner end of the reinforcement rod 25 is fixed (riveted) to the reinforcement rod inner connection member 261, and the outer end of the reinforcement rod 25 is fixed (riveted) to the reinforcement rod external connection member 243.

Figure 5:
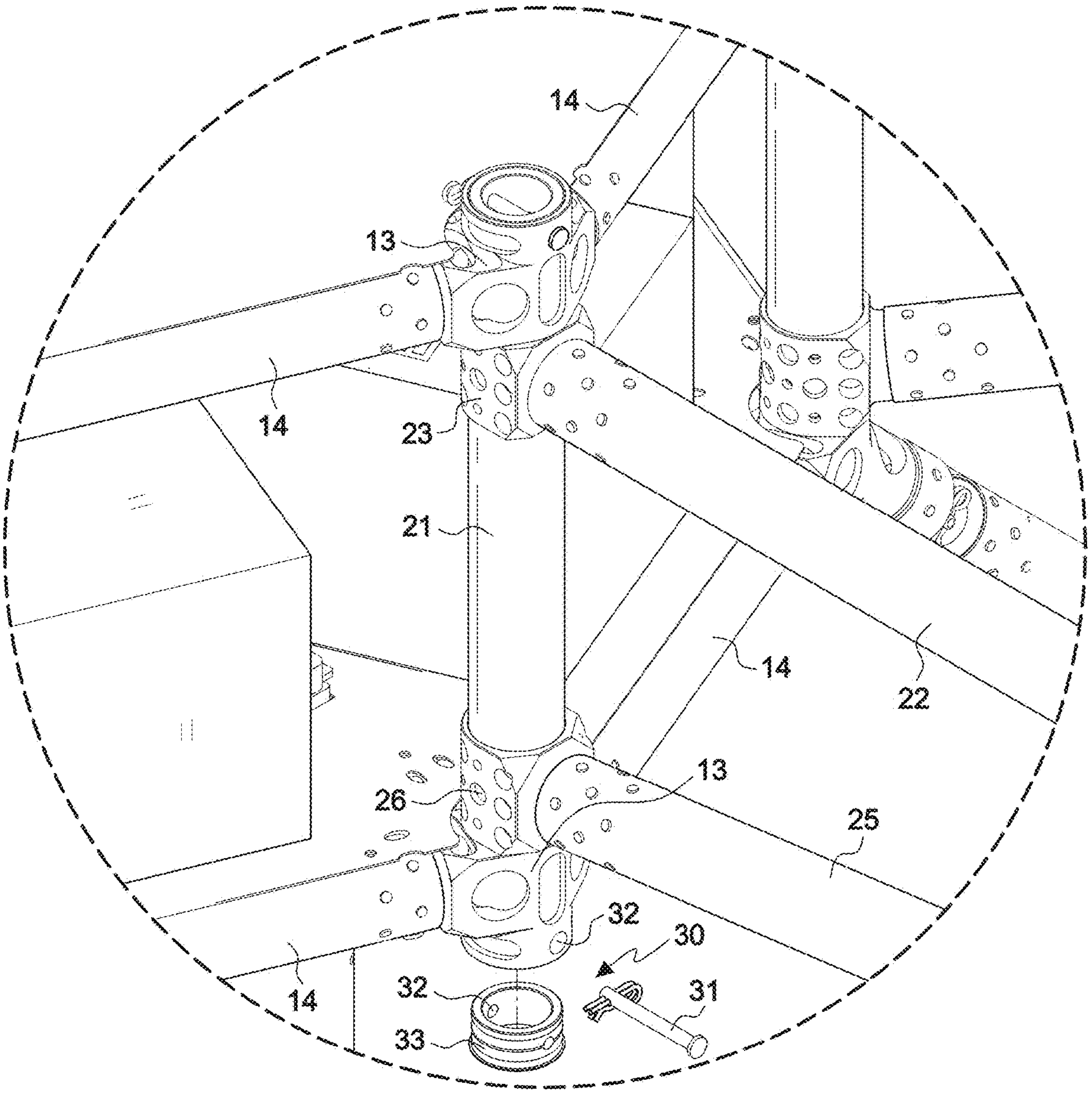
FIG. 5 is a zoom in view of the 5 in FIG. 2.
Figure 6:
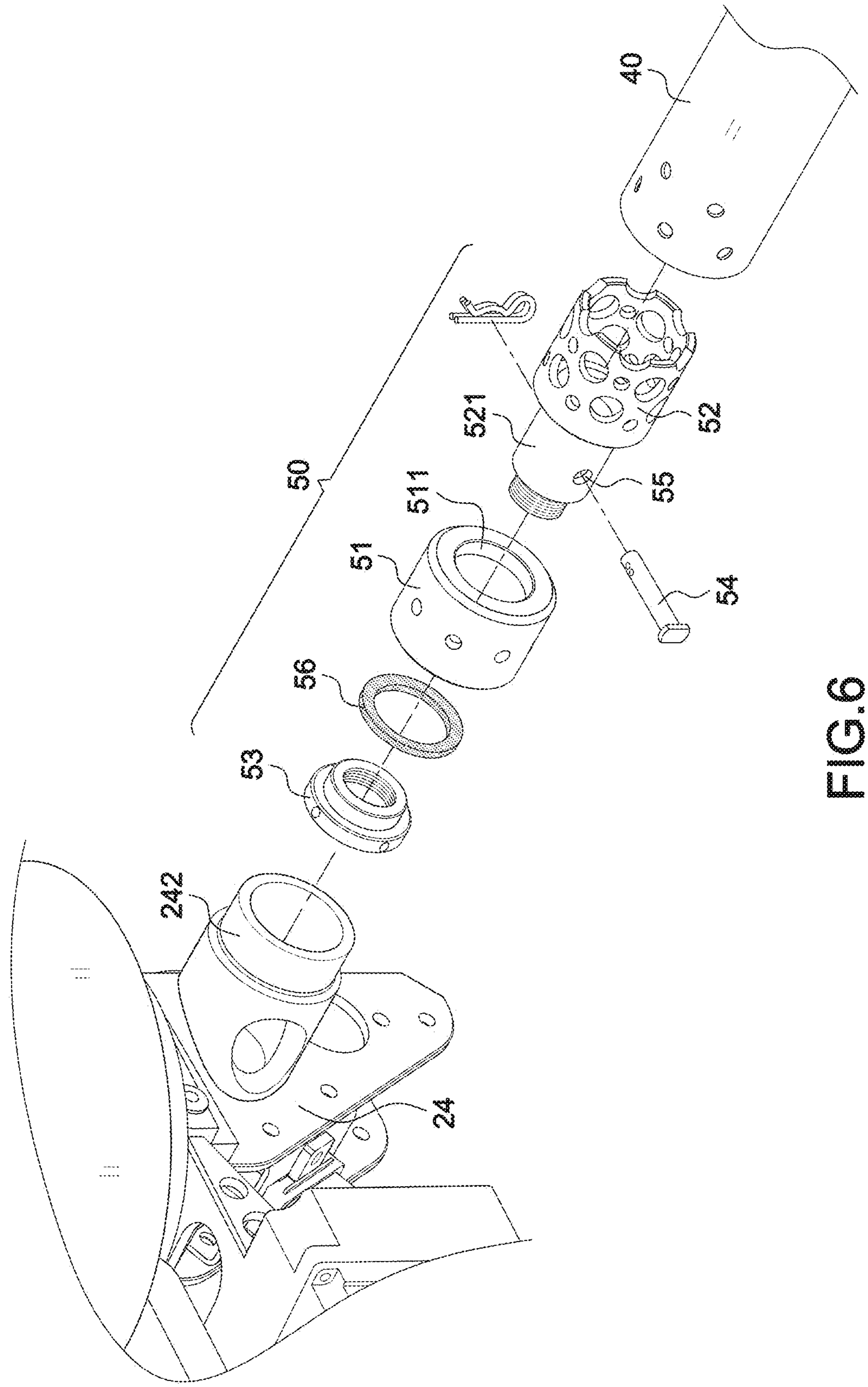
FIG. 6 is an exploded prospective view of the second quick release structure of the present invention.
Figure 7:
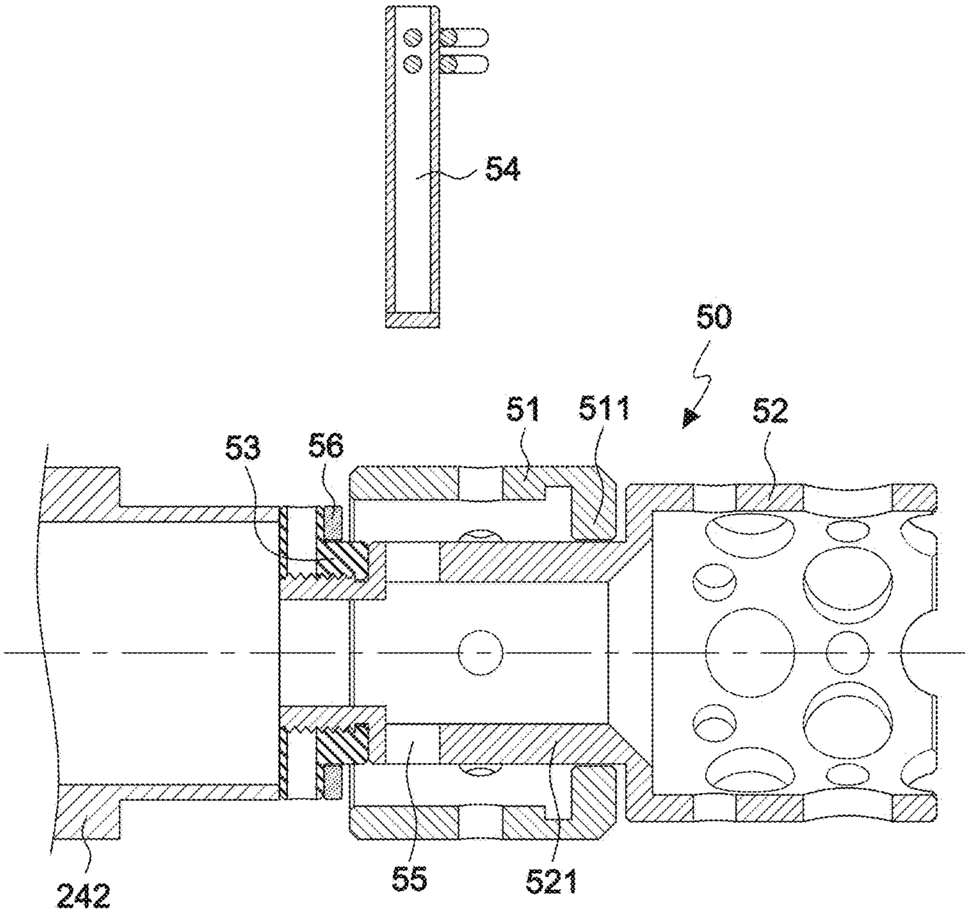
FIG. 7 is a sectional view of the second quick release structure of the present invention (without the movable connection sleeve)
Figure 8:
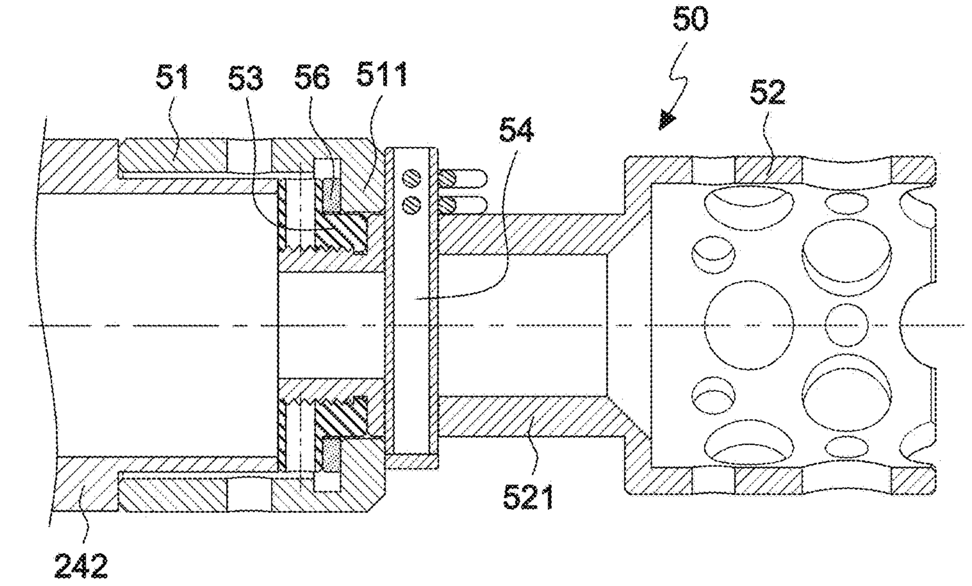
FIG. 8 is a sectional view of the second quick release structure of the present invention (sleeved with the movable connection sleeve)
Figure 9:
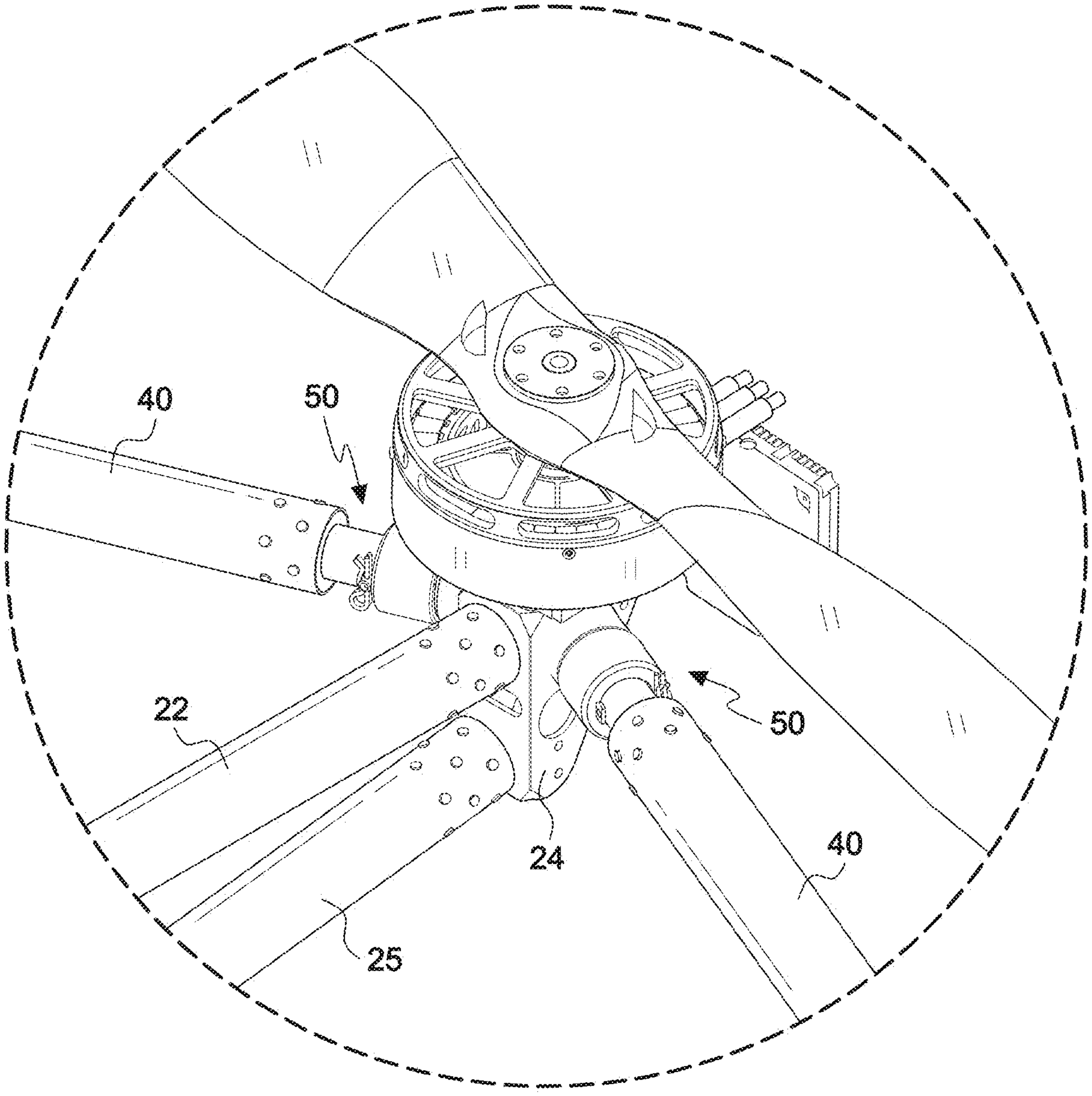
FIG. 9 is a zoom in view of the 5 in FIG. 9.

Referring to FIGS. 3~5, during assembling into a multicopter, the central frames 10 and the machine arm frames 20, the machine arm frames 20 are arranged radially, and the frame edge connection rings 13 of the two central frames 10 are respectively mounted on the upper assembly section 211 and the lower assembly section 212 of the frame edge vertical rods 21, and the frame edge connection rings 13 are connected and positioned on the upper assembly section 211 and the lower assembly section 212 of the frame edge vertical rods 21 by using the first quick release structures 30 one-to-one; the first quick release structure 30 has a first latch 31 and a first latch through hole 32, the first latch through hole 32 is formed on the frame edge connection ring 13 and the frame edge vertical rod 21, and the first latch 31 is set through the first latch through hole 32 to connect and position the frame edge connection ring 13 and the frame edge vertical rod 21; wherein the first quick release structure 30 has a liner plug 33, the liner plug is formed with the first latch through hole 32 and plugged in the frame edge vertical rod 21, wherein the first latch 31 is a flat head pin with a side hole and a cotter pin, the inner liner plug 33 can increase the structural strength of the upper assembly section 211 and the lower assembly section 212 of the frame edge vertical rod 21.

Referring to FIGS. 6~9, during assembling the machine arm positioning rod 40 and the machine arm frame 20, the two ends of the machine arm positioning rods 40 are connected and positioned on the machine arm positioning rod connection member s 242 which arranged in opposite direction by using the second quick release structures 50 one-to-one, and each machine arm positioning rod 40 forms a machine arm frame edge of a surrounding shape; the second quick release structure 50 has a movable connection sleeve 51, a fixed connection sleeve 52, a limiting ring 53, a second latch 54, and a second latch through hole 55, the movable connection sleeve 51 has an inner end reduced member 511, the fixed connection sleeve 52 is fixed (riveted) on the end of the machine arm positioning rod 40, the fixed connection sleeve 52 is extended to have a shaft column member 521, the shaft column member 521 is configured to pass through the inner end reduced member 511, and the limiting ring 53 is combined (screwed) with a head end of the shaft column member 521, the movable connection sleeve 51 is fixed by the inner end reduced member 511 is constrained by the limiting ring 53, the second latch through hole 55 is formed in the radial direction of the shaft column member 521, the second latch 54 is set through the second latch through hole 55 so that the inner end reduced member 511 is configured to press against the limiting ring 53, and the outer end of the movable connection sleeve 51 is connected and positioned to the machine arm positioning rod connection member 242 in a sleeve manner; wherein the second quick release structure 50 has a gasket 56, which is clamped between the inner end reduced member 511 and the limiting ring 53, and the second latch 54 is a flat head pin with a side hole and a cotter pin.

With the features disclosed above, the present invention modularizes the large multicopter into two central frames 10, multiple machine arm frames 20, multiple first quick release structures 30, multiple machine arm positioning rods 40 and multiple second quick release structures 50; central frames 10, multiple machine arm frames 20, the central frames 10 and the machine arm frames 20 are no longer disassembled after being fixed (riveted) to the rods, the end of the machine arm positioning rods 40 are no longer disassembled after the fixed connection sleeve 52 is fixed (riveted); When the flight mission is over, the modular design of the aircraft body does not take up space and is convenient for parking. When the flight mission is required, after being transported to the flight location, the first quick release structure 30 and the second quick release structure 50 are used for assembly, so that the aircraft body can be disassembled for convenient transportation and parking.

Another objective of the present invention is to achieve the effect of machine body size adjustment, by using different lengths of the machine arm frames 20 and the machine arm positioning rods 40.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A modular multicopter, comprising:

two central frames, multiple machine arm frames, multiple first quick release structures, multiple machine arm positioning rods and multiple second quick release structures; each central frame has a central connection unit, multiple frame arm rods, multiple frame edge connection rings and multiple frame side cross rods, the central connection unit is radially formed with multiple frame arm rod inner connection members, an inner end of each frame arm rod is fixed one-to-one to each frame arm rod inner connection member, each frame edge connection ring is formed with a frame arm rod external connection member and two frame edge cross rod connection members, each frame edge connection ring is fixed one-to-one to an outer end of each frame arm rod by corresponding frame arm rod external connection member, and two ends of each frame edge cross rod are respectively fixed two ends of each frame edge cross rod are respectively fixed to the two frame edge cross rod connection members, the two frame edge cross rod connection members are arranged in opposite directions relative to the frame edge cross rod;

each machine arm frame includes a frame edge vertical rod, a machine arm rod, a machine arm rod inner connection ring and a machine arm rod external connection unit, the machine arm rod inner connection ring is fixed to the frame edge vertical rod, the frame edge vertical rod comprises an upper assembly section and a lower assembly section, the machine arm rod inner connection ring forms a machine arm rod inner connection member, an inner end of the machine arm rod is fixed to the machine arm rod inner connection member, the machine arm rod external connection unit forms a machine arm rod external connection member and two machine arm positioning rod connection members, and the machine arm rod external connection unit is fixed to an outer end of the machine arm rod by corresponding machine arm rod external connection member;

the machine arm frames are arranged radially, and the frame edge connection rings of the two central frames are respectively mounted on the upper assembly section and the lower assembly section of the frame edge vertical rods, and the frame edge connection rings are connected and positioned on the upper assembly section and the lower assembly section of the frame edge vertical rods by using the first quick release structures one-to-one, by using the second quick release structures, two ends of the machine arm positioning rods are one-to-one connected and positioned on the machine arm positioning rod connection members, the machine arm positioning rod connections members are arranged in opposite directions relative to the machine arm positioning rods.

2. The modular multicopter as claimed in claim 1, wherein each machine arm frame has a reinforcement rod and a reinforcement rod inner connection ring, the machine arm rod external connection unit forms a reinforcement rod external connection member, the reinforcement rod inner connection ring is fixed to the frame edge vertical rod, the reinforcement rod inner connection ring forms a reinforcement rod inner connection member, an inner end of the reinforcement rod is fixed to the reinforcement rod inner connection member, and an outer end of the reinforcement rod is fixed to the reinforcement rod external connection member.

3. The modular multicopter as claimed in claim 1, wherein the first quick release structure has a first latch and a first latch through hole, the first latch through hole is formed on the frame edge connection rings and the frame edge vertical rod, and the first latch is set through the first latch through hole to connect and position the frame edge connection rings and the frame edge vertical rod.

4. The modular multicopter as claimed in claim 3, wherein the first quick release structure has a liner plug, the liner plug is formed with the first latch through hole and plugged in the frame edge vertical rod.

5. The modular multicopter as claimed in claim 4, wherein the first latch is a flat head pin with a side hole and a cotter pin.

6. The modular multicopter as claimed in claim 1, wherein the second quick release structure has a movable connection sleeve, a fixed connection sleeve, a limiting ring, a second latch, and a second latch through hole, the movable connection sleeve has an inner end reduced member, the fixed connection sleeve is fixed on the end of the machine arm positioning rods, the fixed connection sleeve is extended a shaft column member, the shaft column member is configured to pass through the inner end reduced member, and the limiting ring is combined with a head end of the shaft column member, the movable connection sleeve is fixed by the inner end reduced member being constrained by the limiting ring, the second latch through hole is formed in the radial direction of the shaft column member, the second latch is set through the second latch through hole so that the inner end reduced member is configured to press against the limiting ring, and an outer end of the movable connection sleeve is connected and positioned relative to the machine arm positioning rod connection member in a sleeved manner.

7. The modular multicopter as claimed in claim 6, wherein the second quick release structure has a gasket, which is clamped between the inner end reduced member and the limiting ring.

8. The modular multicopter as claimed in claim 7, wherein the second latch is a flat head pin with a side hole and a cotter pin.

* * * * *